United States Patent
Oh et al.

(10) Patent No.: US 9,842,181 B1
(45) Date of Patent: Dec. 12, 2017

(54) METHOD TO OPTIMIZE GENERAL-PURPOSE INPUT/OUTPUT INTERFACE PAD ASSIGNMENTS FOR INTEGRATED CIRCUIT

(71) Applicant: ALTERA CORPORATION, San Jose, CA (US)

(72) Inventors: Kyung Suk Oh, Cupertino, CA (US); Yee Huan Yew, Bayan Lepas (MY); Chee Cheong Tan, Georgetown (MY); Mei See Chin, Gelugor (MY); Wai Ling Lee, Bayan Lepas (MY); Loke Yip Foo, Ipoh (MY); Chooi Ian Loh, Sungai Bakap (MY); Hui Lee Teng, Gelugor (MY)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 15/162,918

(22) Filed: May 24, 2016

(51) Int. Cl.
G06F 17/50 (2006.01)

(52) U.S. Cl.
CPC ...... *G06F 17/5054* (2013.01); *G06F 17/5068* (2013.01)

(58) Field of Classification Search
CPC .................. G06F 17/5054; G06F 17/5068
See application file for complete search history.

(56) References Cited

U.S. PATENT DOCUMENTS

| | | | |
|---|---|---|---|
| 7,098,670 B2 * | 8/2006 | Cole .................... | G01R 27/28 324/601 |
| 7,331,022 B1 | 2/2008 | Pritchard et al. | |
| 7,409,652 B1 | 8/2008 | Fox et al. | |
| 7,523,430 B1 * | 4/2009 | Patel .................. | G06F 17/5036 716/104 |
| 7,800,214 B2 * | 9/2010 | Yoshikawa ....... | H01L 23/49838 257/691 |
| 7,823,096 B2 * | 10/2010 | Katagiri ............. | G06F 17/5036 257/738 |
| 7,956,641 B1 * | 6/2011 | Peng ................ | H03K 3/356182 326/62 |
| 8,001,508 B1 * | 8/2011 | Daud .................. | G06F 17/5036 716/109 |
| 8,255,844 B2 | 8/2012 | Kato et al. | |

(Continued)

Primary Examiner — Naum B Levin
(74) Attorney, Agent, or Firm — Okamoto & Benedicto LLP

(57) ABSTRACT

The present disclosure relates to an innovative method of assigning signals to general-purpose input/output pads of an integrated circuit chip. An inductance matrix for the input/output pads is obtained. A candidate assignment is made of a differential signal to a pair of the input/output pads, and a differential mutual inductance is determined for each open pad location in relation to the pair of input/output pads. Single-ended signals are assigned to open pad locations having the lowest differential mutual inductances. The jitter contribution due to each assigned single-ended signal is computed, and a total jitter is updated. In a first embodiment, said assigning, computing and updating steps are repeated until the total jitter exceeds a total jitter budget. In a second embodiment, said assigning, computing and updating steps are repeated until a number of assigned single-ended signals is equal to a target number. Other embodiments and features are also disclosed.

21 Claims, 7 Drawing Sheets

(56) References Cited

U.S. PATENT DOCUMENTS

| | | | |
|---|---|---|---|
| 8,302,067 B2 * | 10/2012 | Lee | H01L 23/49838 |
| | | | 716/137 |
| 8,719,751 B1 * | 5/2014 | Fender | G06F 17/5036 |
| | | | 716/115 |
| 9,053,285 B2 | 6/2015 | Darden et al. | |
| 2003/0102549 A1 | 6/2003 | Lin | |
| 2014/0218871 A1 * | 8/2014 | Kim | H01R 12/7088 |
| | | | 361/748 |

* cited by examiner

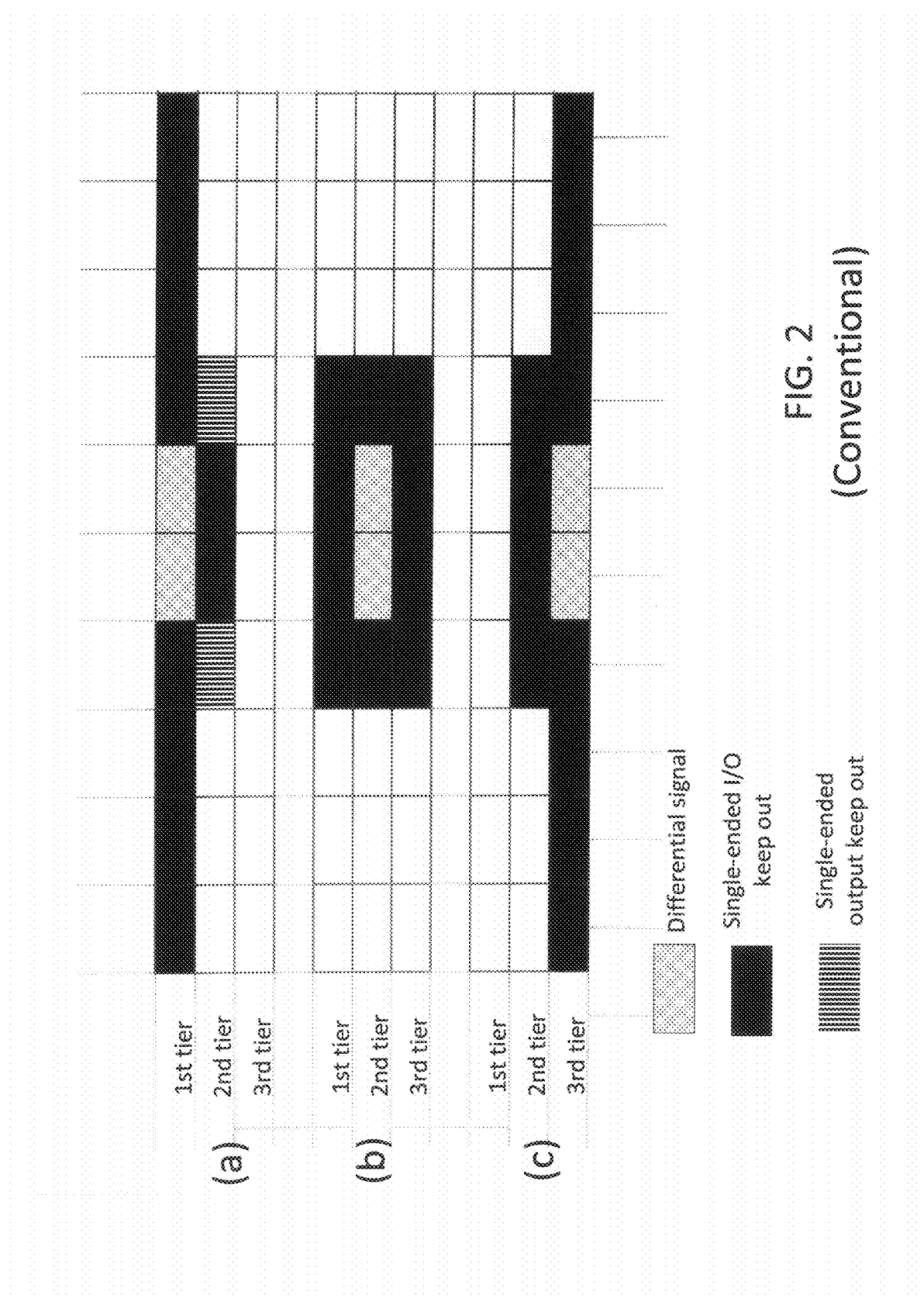
FIG. 2
(Conventional)

METHOD TO OPTIMIZE GENERAL-PURPOSE INPUT/OUTPUT INTERFACE PAD ASSIGNMENTS FOR INTEGRATED CIRCUIT

BACKGROUND

Technical Field

The present invention relates generally to integrated circuits and methods of configuring integrated circuits.

Description of the Background Art

In the field of electronics, various electronic design automation tools are useful for automating the process by which integrated circuits, multi-chip modules, boards, etc., are designed and manufactured. In particular, EDA tools are useful in the design of standard integrated circuits, custom integrated circuits (e.g., ASICs), and in the design of custom configurations for programmable integrated circuits.

Integrated circuits that may be programmable by a customer to produce a custom design for that customer include programmable logic devices (PLDs). Often, such PLDs are designed and programmed by a design engineer using an electronic design automation tool.

SUMMARY

The present disclosure provides an innovative method of assigning signals to general-purpose input/output pads of an integrated circuit chip. An inductance matrix for the input/output pads is obtained. A candidate assignment is made of a differential signal to a pair of the input/output pads, and a differential mutual inductance is determined for each open pad location in relation to the pair of input/output pads. Single-ended signals are assigned to open pad locations having the lowest differential mutual inductances. The jitter contribution due to each assigned single-ended signal is computed, and a total jitter is updated. In a first embodiment, said assigning, computing and updating steps are repeated until the total jitter exceeds a total jitter budget. In a second embodiment, said assigning, computing and updating steps are repeated until a number of assigned single-ended signals is equal to a target number.

Another embodiment relates to a non-transitory computer-readable medium for assigning signals to general-purpose input/output pads of an integrated circuit chip, comprising instructions stored thereon, that when executed on a processor, perform the steps of: obtaining an inductance matrix for the input/output pads; making a candidate assignment of a differential signal to a pair of the input/output pads; determining a differential mutual inductance for each open pad location in relation to the pair of input/output pads; assigning a single-ended signal to an open pad location having a lowest differential mutual inductance; computing a jitter contribution due to the single-ended signal; and updating a total jitter with the jitter contribution.

Another embodiment relates to a system for assigning signals to general-purpose input/output pads of an integrated circuit chip. The system includes an electronic-design automation tool executing on a computer, and a signal-to-pad assignment module of the electronic-design automation tool. The module is programmed to perform the steps of: obtaining an inductance matrix for the input/output pads; making a candidate assignment of a differential signal to a pair of the input/output pads; determining a differential mutual inductance for each open pad location in relation to the pair of input/output pads; assigning a single-ended signal to an open pad location having a lowest differential mutual inductance; computing a jitter contribution due to the single-ended signal; and updating a total jitter with the jitter contribution.

Other embodiments and features are also disclosed.

BRIEF DESCRIPTION OF THE DRAWINGS

FIG. 2 depicts conventional location-based guidelines for a bank of GPIO pads given an assigned differential signal.

DETAILED DESCRIPTION

The present disclosure refers to the communication of signals from an integrated circuit to external devices via I/O pads. These pads may be physically connected by wire-bonding or other connection means to an array of pins or balls or other conductive means that may be connected to communicate electrical signals to the external devices.

As more and more functionality has been placed onto PLDs, the number of input/output (I/O) pads provided for communication between the PLD and external devices has drastically increased. The signal-to-pad assignments for thousands of I/O pads may be handled by a designer assigning the I/O pads in a largely manual manner.

However, such manual assignments may result in a large amount of undesirable crosstalk between signals. For example, consider the case depicted in FIG. 1.

Figure 1:
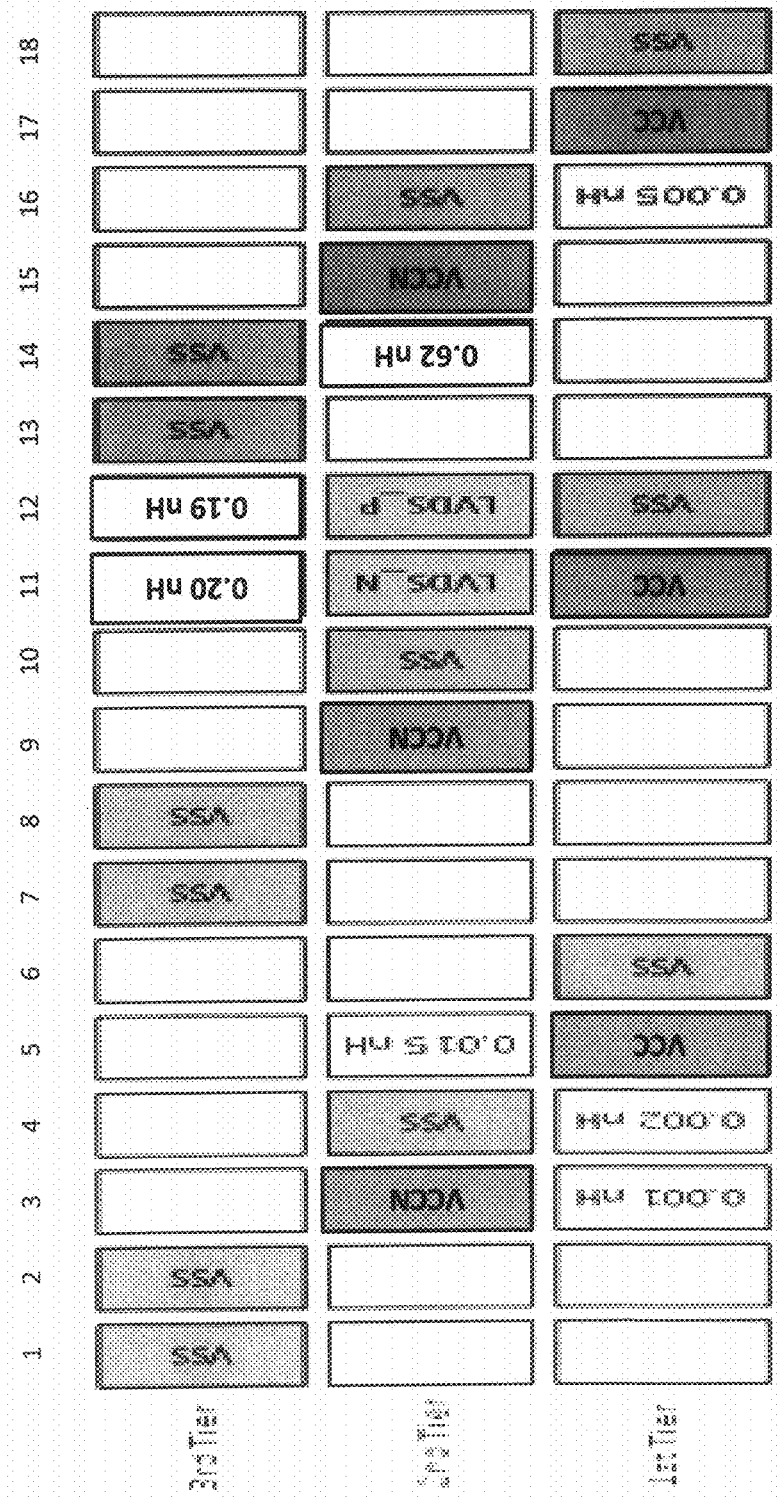
FIG. 1 depicts a multi-tier bank of general-purpose I/O (GPIO) interface pads with example signal-to-pad assignments given an assigned differential signal.

As shown in FIG. 1, a bank of I/O pads may include multiple tiers of I/O pads. In one example, each tier may physically comprise I/O pads for wire bonding on its boundary, and the tiers may be stacked in such a way that the I/O pads of each tier are not blocked by upper tiers. The particular bank of I/O pads in FIG. 1 has three tiers (first, second and third), and each tier has eighteen pads at positions numbered from 1 to 18.

In this example, consider that the signals to be assigned include one differential signal (LVDS) and multiple single-ended signals (12 mA LVTTL). In particular, the differential signal is assigned to the I/O pads at positions 11 and 12 in the $2^{nd}$ tier, while the seven single-ended signals are assigned to I/O pads at the following locations (tier, position): ($1^{st}$ tier, $3^{rd}$ position); ($1^{st}$ tier, $4^{th}$ position); ($1^{st}$ tier, $16^{th}$ position); ($1^{st}$ tier, $5^{th}$ position); ($2^{nd}$ tier, $14^{th}$ position); ($3^{rd}$ tier, $11^{th}$ position); and ($3^{rd}$ tier, $12^{th}$ position). These seven pad locations happen to have differential mutual inductance values (in nanoHenry or nH) as shown in the diagram. Furthermore, consider that the differential signal has a total jitter budget of 188 picoseconds (ps).

In this particular example, the total jitter caused by the seven single-ended signals is 187 ps with a 1 ps margin below the total jitter budget. The total jitter is composed of 59 ps of SSN jitter due to the 7 assigned I/O signals and 128 ps of crosstalk jitter. In this case, the crosstalk jitter is dominant with 68% of the total jitter, while SSN jitter is only 32% of the total jitter. The relatively high crosstalk jitter is primarily due to the pads with relatively high differential mutual inductances of 0.62 nH, 0.2 nH, and 0.19 nH. These three pads alone cause crosstalk jitter of 125 ps out of the 128 ps. It is highly desirable to avoid the high crosstalk contributions due to assigning single-ended signals to these three pads.

Location-Based Guidelines

To avoid high crosstalk contributions discussed above, location-based guidelines may be used. Location-based guidelines generally prohibit higher-speed single-ended signals from being assigned to certain pads that are in the neighborhood of pads transmitting a differential signal.

FIG. 2 depicts exemplary location-based guidelines for a multi-tier bank of general-purpose I/O pads due to the presence of a differential signal.

Row (a) of FIG. 2 depicts a first case in which a differential signal (filled with dotted pattern) is assigned to a pair of adjacent pads in a first tier of I/O pads in a bank. In this case, four I/O pads on either side of the differential signal in the first tier are designated as being single-ended I/O keep out (filled with solid black). In other words, the guideline is that no single-ended I/O signal (neither input, nor output) may be assigned to these pads.

In the second tier, the two I/O pads that are directly beneath the differential signal are also designated as being single-ended I/O keep out (filled with solid black). The next nearest two I/O pads in the second tier (one step diagonal from the differential signal) are designated as being single-ended output keep out (filled with vertical black/white stripes). In other words, the guideline is that no single-ended output signal may be assigned to these pads, but single-ended input signals are allowed to be assigned to these pads.

Lastly, the third tier of I/O pads is not designated as needing to keep out single-ended signals. This is because these pads are sufficiently far distant from the differential signal.

Row (b) of FIG. 2 depicts a second case in which a differential signal (filled with dotted pattern) is assigned to a pair of adjacent pads in the second tier of I/O pads in a bank. In this case, one I/O pad on either side of the differential signal in the second tier are designated as being single-ended I/O keep out (filled with solid black). In the first and third tiers, the four nearest I/O pads above and below the differential signal are also designated as being single-ended I/O keep out (filled with solid black). The remaining I/O pads are not designated as needing to keep out single-ended signals due to their being sufficiently distant from this differential signal.

Row (c) of FIG. 2 depicts the rule for when the differential signal (filled with dotted pattern) is in the third tier of output pads. In this case, four pads on either side of the differential signal in the third tier are designated as being single-ended I/O keep out (filled with solid black). In the second tier, the four nearest pads nearest to the differential signal are also designated as being single-ended I/O keep out (filled with solid black). The remaining pads are pads are not designated as needing to keep out single-ended signals due to their being sufficiently distant from this differential signal.

Note that the above-discussed location-based rules to keep out single-ended signals from certain pads in the neighborhood of the differential signal may apply to certain single-ended signals, but not others. For example, the rules may not apply to single-ended signals that are of sufficiently low speed such that they do not cause substantial crosstalk issues for the differential signal.

In addition to the above-discussed location-based keep-out rules, there are generally also limits to the total proportion of I/O pads in a bank that may be assigned to single-ended I/O signals. For example, the total proportion of I/O pads in a bank that may be assigned to single-ended I/O signals may be a predetermined percentage, such as 50%. The predetermined percentage may differ, depending on the type of single-ended I/O signal. For example, the percentage may be 50% for 2.5-V LVTTL 16 mA signals, while the percentage may be 60% for 2.5-V LVTTL 12 mA signals and may be 90% for 2.5-V LVTTL 8 mA signals.

Of particular interest, the location-based rule depicted in Row (b) may be applied to the example discussed above in relation to FIG. 1. If the rule were applied, then the assignments of single-ended signals to the I/O pads at positions 11 and 12 of the third tier would be prevented by the keep-out designation. However, the assignment of the single-ended signal to the I/O pad at position 14 of the second tier would not be prevented.

Hence, the above-discussed guidelines may be effective in preventing some unwanted signal-to-pad assignments that cause high crosstalk contributions. The guidelines are, however, rough and do not prevent all signal-to-pad assignments that cause high crosstalk contributions. As a result, even with the use of location-based guidelines, the I/O pads are typically underutilized, and/or the performance of the signals may be compromised.

Method of Optimizing General-Purpose I/O Interface Pad Assignments

The present disclosure provides a solution that substantially increases the utilization of the I/O pads and/or improves performance by reducing jitter. The solution is method that optimizes signal-to-pad assignments for a general-purpose I/O (GPIO) interface.

In an exemplary implementation, the GPIO interface may be for an integrated circuit which is a programmable logic device (PLD). The PLD may be, for example, a field programmable gate array (FPGA).

Figure 3:
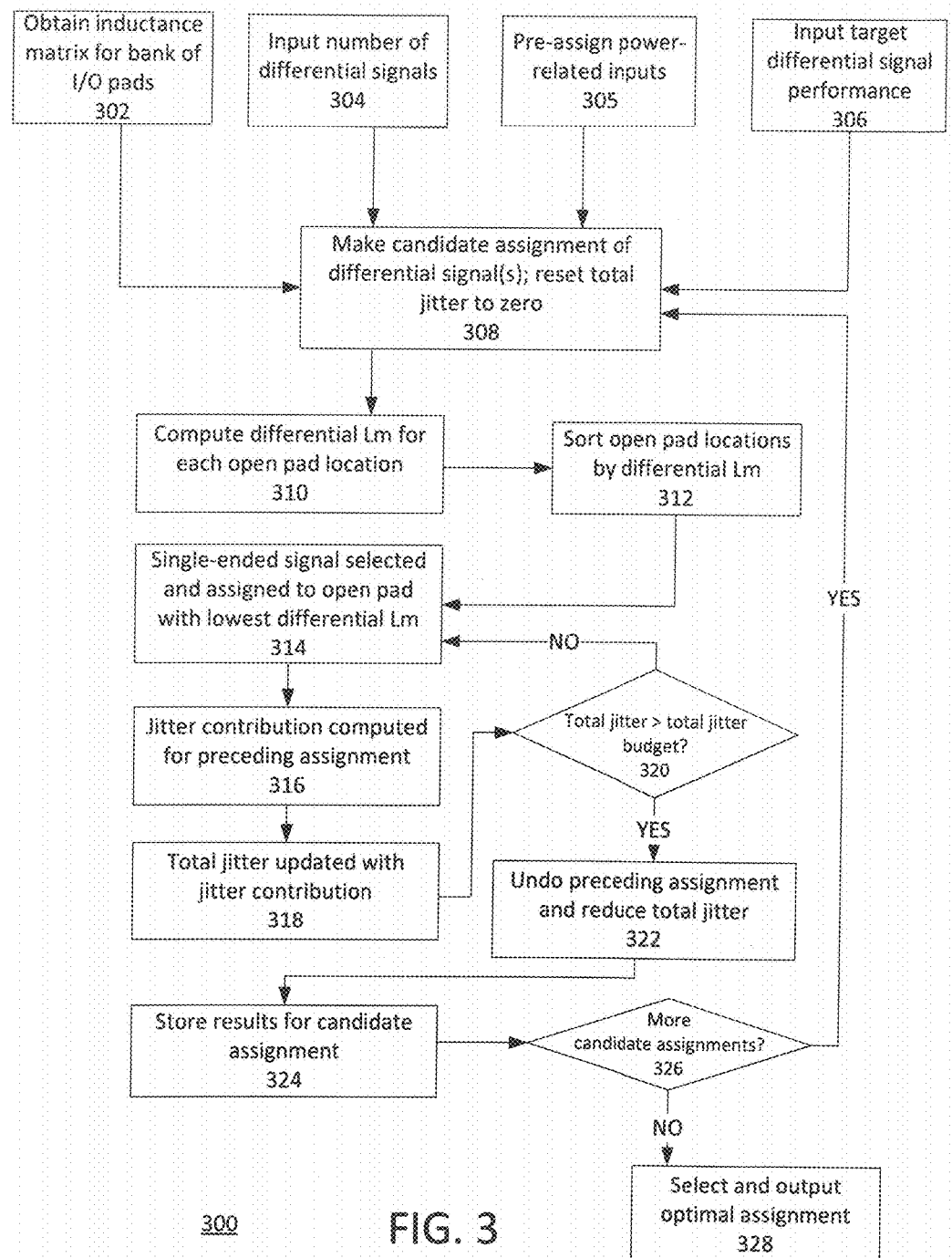
FIG. 3 is a flow chart of a method of optimizing signal-to-pad assignments for a GPIO interface in accordance with an embodiment of the invention.

FIG. 3 is a flow chart of a method 300 of optimizing signal-to-pad assignments for a GPIO interface in accordance with an embodiment of the invention. The method 300 may be performed by an IC design tool, such as, for example a PLD design tool.

Per step 302, an inductance matrix is obtained for a bank of I/O pads. The inductance matrix provides a mutual inductance $L_m(j,k)$ between the I/O pad at pad location j in the bank and the I/O pad at location k in the bank, where pad location j is distinct and different from pad location k. The pad at position j may be specified, for example, by tier $t_j$ and position $p_j$ in that tier. Similarly, the pad at pad location k may be specified, for example, by tier $t_k$ and position $p_k$ in that tier.

In one exemplary implementation, the inductance matrix may be generated by empirical measurements. Such measurements may involve quantitatively measuring an effect that a first signal at location j has on a second signal at location k in the bank. Alternatively, the inductance matrix may be generated by computer modeling and simulation to determine the inductances between each pair of locations in the bank. Note that the inductance matrix is symmetrical in that $L_m(j,k)=L_m(k,j)$. Once generated, the inductance matrix for a bank may be stored for use in this method 300.

Per step 304, the number and type of differential signals may be input to the design tool. For example, the number of differential signal may be one differential signal, two differential signals, or more. The type of differential signal may be, for example, a specified LVDS (low-voltage differential signaling) signal, or a specified LVPECL (low-voltage positive emitter coupled logic) signal.

Per step 305, certain I/O pads may be pre-assigned to power-related inputs, such as power supplies or ground. These pads are not available to be assigned to differential or single-ended signals. In the example depicted in FIG. 4, power supply inputs indicated by VSS, VCC and VCCN may be pre-assigned to their I/O pads.

Per step 306, a target differential signal performance may be input to the design tool. For example, a target differential signal performance may be a total jitter budget that is not to be exceeded by any of the differential signals. For example, the total jitter budget may be 188 picoseconds (ps). The total jitter may include both simultaneous switching noise (SSN) jitter and crosstalk jitter.

Per step 308, a candidate assignment is made of the differential signal(s) to pad locations in the bank, and a total jitter may be reset to zero. The candidate assignment may be made using one of various procedures. The candidate assignment may be made using a deterministic algorithm or pseudo-random algorithm. For example, the deterministic algorithm may select each possible adjacent pair of pads in series for assignment to a differential signal.

Figure 4:
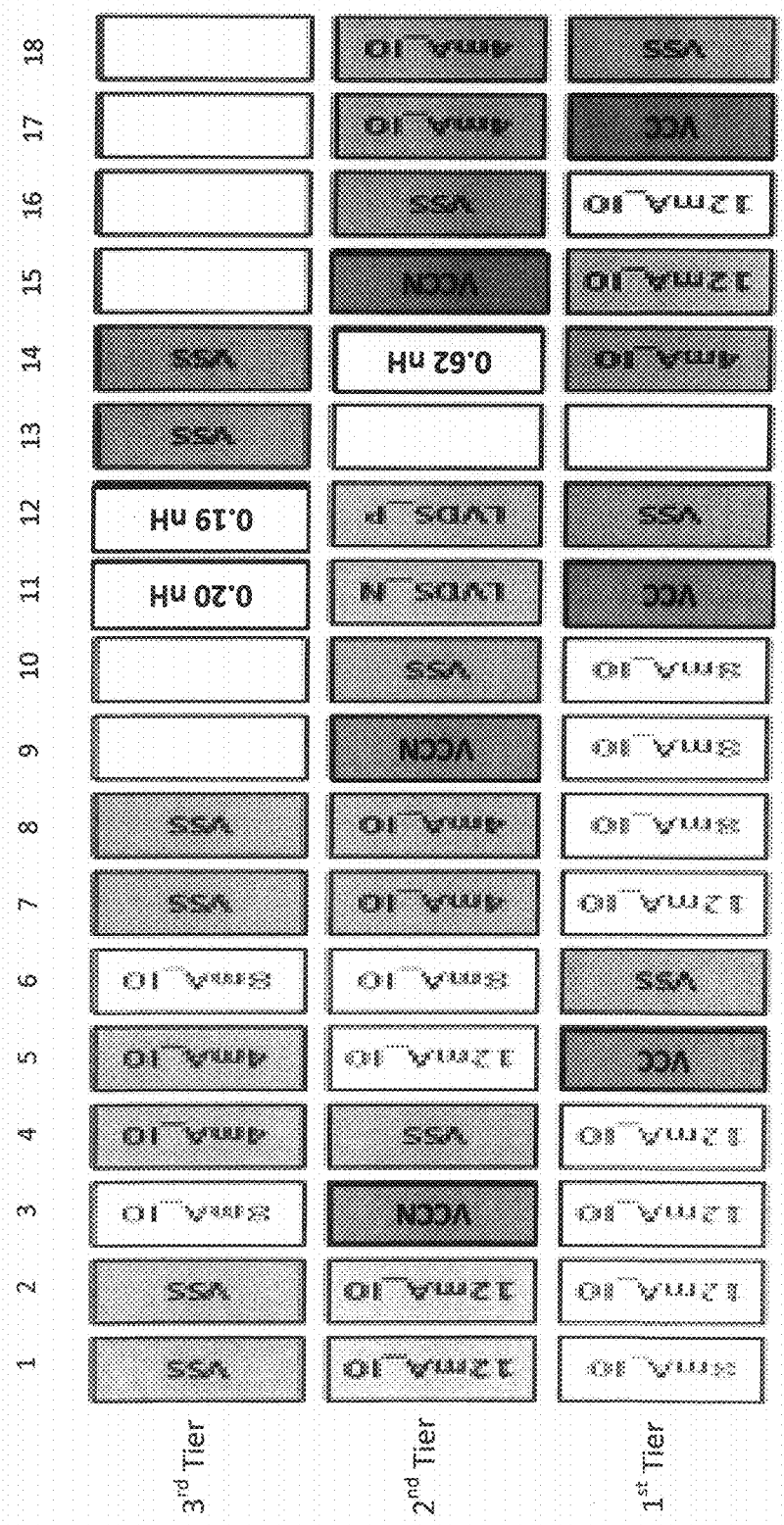
FIG. 4 depicts a multi-tier bank of GPIO interface pads with example signal-to-pad assignments given an assigned differential signal in accordance with an embodiment of the invention.

One example of a candidate assignment is depicted in FIG. 4. As seen in FIG. 4, there is one differential signal (an LVDS signal), and the negative (LVDS_N) and positive (LVDS_P) signals of the one differential signal are assigned, respectively, to the adjacent pads at position numbers 11 and 12 in the $2^{nd}$ tier of the bank.

Given the candidate assignment of the differential signal(s), pad locations for potential single-ended signals are assigned starting from the lowest differential mutual inductance. An exemplary implementation of such a procedure is described as follows.

Per step 310, the differential mutual inductance (differential $L_m$) may be computed for each open (unassigned) pad location in relation to the differential signal(s). The differential $L_m$ for pad location j given N differential signals (n=1 to N) may be computed by the following equation:

$$\text{differential } L_m(j) = \Sigma_{n=1}^{N} ABS[L_m(j, n_{pos}) - L_m(j, n_{neg})] \quad \text{(Eq. 1)}$$

where ABS indicates the absolute value function, $n_{pos}$ is the pad location of the positive single-ended signal of differential signal n, and $n_{neg}$ is the pad location of the negative single-ended signal of differential signal n.

Note that, in the example illustrated in FIG. 4, there is only one differential signal (i.e. N=1), so there is only one term in the summation. If there were two differential signals assigned to the I/O pads of the bank (i.e. N=2), then there would be two terms in the summation. And so on.

Per step 312, the open (unassigned) pad locations may be sorted by their differential $L_m$. In an exemplary implementation, the sorted result may be from lowest differential $L_m$ to highest differential $L_m$.

Per step 314, a single-ended signal is selected and assigned to the I/O pad with the lowest differential $L_m$ that is still open (i.e. to which no signal has yet been assigned). The single-ended signal may be of a particular type, such as, for example, a specified SSTL (stub-series terminal logic) or a specified LVTTL (low-voltage transistor-to-transistor logic) signal.

In the example depicted in FIG. 4, the single-ended signals include various 12 mA (milliampere), 8 mA and 4 mA single-ended I/O signals, and one of these single-ended I/O signals may be selected and assigned in this step. In one implementation, the higher-current I/O signals may be selected before the lower-current I/O signals. Note that, once an I/O pad has a signal assigned to it, then it is no longer considered to be open.

Per step 316, a jitter contribution due to the signal-to-pad assignment of step 314 may be computed. The jitter contribution includes SSN jitter and crosstalk jitter. The SSN jitter depends upon the switching speed of the single-ended signal. In addition to depending upon the switching speed of the single-ended signal, the crosstalk jitter also depends strongly on the location of the assigned I/O pad relative to the pad location(s) of the differential signal(s).

Per step 318, the total jitter is updated by the jitter contribution computed in step 316. Per step 320, the total jitter is then compared against the total jitter budget.

If the total jitter is less than the total jitter budget, then the method 300 may loop back to step 314 and a next single-ended signal may be selected and assigned to the unassigned I/O pad with the lowest differential mutual inductance. On the other hand, if the total jitter is greater than (or equal to) the total jitter budget, then the method may proceed to step 322.

Per step 322, the latest signal-to-pad assignment may be undone, and the total jitter may be reduced by the jitter contribution of that signal-to-pad assignment. This brings the total jitter back below the total jitter budget.

Per step 324, the resultant set of signal-to-pad assignments for the single-ended signals, along with the computed total jitter, may be stored in relation to the candidate assignment of the differential signal(s). The step stores the results for each candidate assignment so that a best or optimal candidate assignment may be determined by comparison of the results.

In the example depicted in FIG. 4, the resultant set of signal-to-pad assignments for the single-ended signals includes: nine pads driven by 12 mA I/O signals (assigned to positions 2, 3, 4, 7, 15 and 16 in the $1^{st}$ Tier and positions 1, 2 and 5 in the $2^{nd}$ Tier); seven pads driven by 8 mA I/O signals (assigned to positions 1, 8, 9 and 10 in the $1^{st}$ Tier, position 6 in the $2^{nd}$ Tier, and positions 3 and 6 in the $3^{rd}$ Tier); and seven pads driven by 4 mA I/O signals (assigned to position 14 in the $1^{st}$ Tier, positions 7, 8, 17 and 18 in the $2^{nd}$ Tier, and positions 4 and 5 in the $3^{rd}$ Tier). Note that the high differential mutual inductances at pads 11 and 12 of the $3^{rd}$ Tier and pad 14 of the $2^{nd}$ Tier are avoided.

Advantageously, instead of seven single-ended I/O signals assigned as in FIG. 1, there are 9+7+7=23 single-ended I/O signals assigned in FIG. 4. Hence, utilization of the I/O pads is substantially increased.

Thereafter, per step 326, a determination may be made as to whether any further candidate assignment is to be processed. If further candidate assignments are to be processed, then the method 300 may loop back to step 308 such that a next candidate assignment of the differential signal(s) to pad locations may be made. Each candidate assignment assigns the differential signal(s) differently from other candidate assignments. The method 300 then proceeds to process this next candidate assignment per steps 310 to 324.

Once no further candidate assignments are to be processed, then the method 300 may move forward to step 328. In step 328, a determination may be made as to which candidate assignment resulted in the highest number of single-ended signals being assigned within the total jitter budget. That candidate assignment may then be output (and/or stored) as the optimal assignment.

The optimal assignment data that is output (and/or stored) in step 328 specifies the pad locations for the differential signal(s) and the pad locations for the single-ended signals that are assigned. The optimal assignment data may also include the total jitter computed for the optimal assignment.

Figure 5:
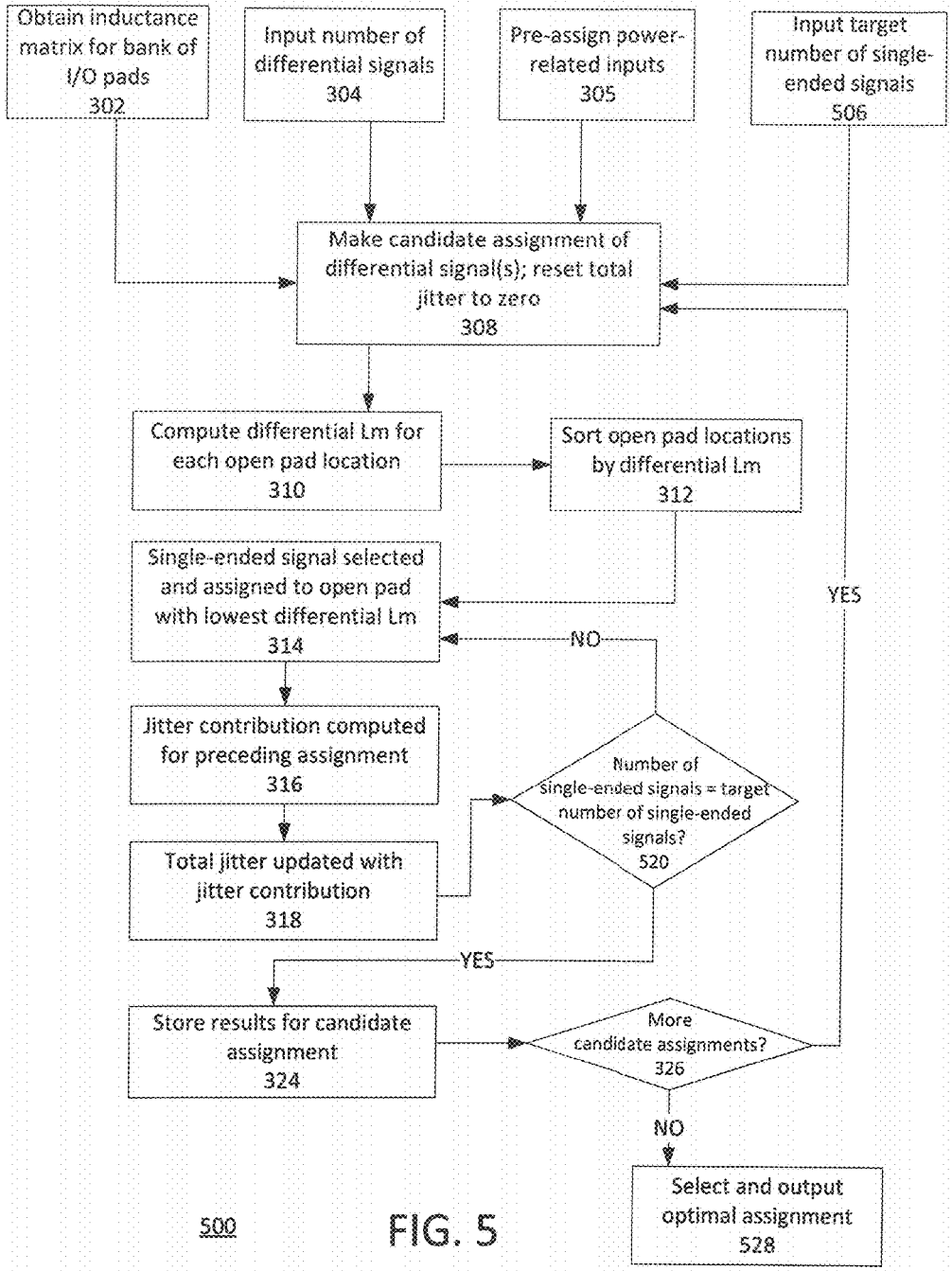
FIG. 5 is a flow chart of an alternate method of optimizing signal-to-pad assignments for a GPIO interface in accordance with an embodiment of the invention.

FIG. 5 is a flow chart of an alternate method 500 of optimizing signal-to-pad assignments for a GPIO interface in accordance with an embodiment of the invention. The method 500 may be performed by an IC design tool, such as, for example a PLD design tool.

The method 500 of FIG. 5 has many steps in common with the method 300 of FIG. 3. Instead of step 306 in FIG. 3, there is step 506 in FIG. 5. Instead of steps 320-322 in FIG. 3, there is step 520 in FIG. 5. Finally, instead of step 328 in FIG. 3, there is step 528 in FIG. 5.

Per step 506, a target number of single-ended signals may be input to the design tool. For example, the target number of single-ended signals may be 10 or another number. The method 500 of FIG. 5 will determine an optimal assignment of signals to I/O pads. The assignment is optimal in that it will result in the highest performance of the differential signal(s). In particular, the total jitter will be lowest for the optimal assignment.

Per step 520, after the total jitter is updated in step 318, a determination is made as whether the number of single-ended signals that have so far been assigned (in relation to the present candidate assignment) is equal to the target number of single-ended signals specified in step 506. If the number of assigned single-ended signals is less than the target number, then the method 500 loops back to step 314 and selects and assigns a next single-ended signal. On the other hand, when the number of assigned single-ended signals is equal to the target number, then the method 500 may move forward to step 324, which stores the resultant set of signal-to-pad assignments for the target number of single-ended signals, along with the computed total jitter, in relation to the candidate assignment of the differential signal(s).

Finally, per step 528, once it is determined in step 326 that there are no more candidate assignments of the differential signal(s) to process, then a determination may be made as to which candidate assignment resulted in the best performance (i.e. lowest total jitter). That candidate assignment may then be output (and/or stored) as the optimal assignment.

The optimal assignment data that is output (and/or stored) in step 528 specifies the pad locations for the differential signal(s) and the pad locations for the single-ended signals that are assigned. The optimal assignment data may also include the total jitter computed for the optimal assignment.

Exemplary PLD and PLD Development System

Figure 6:
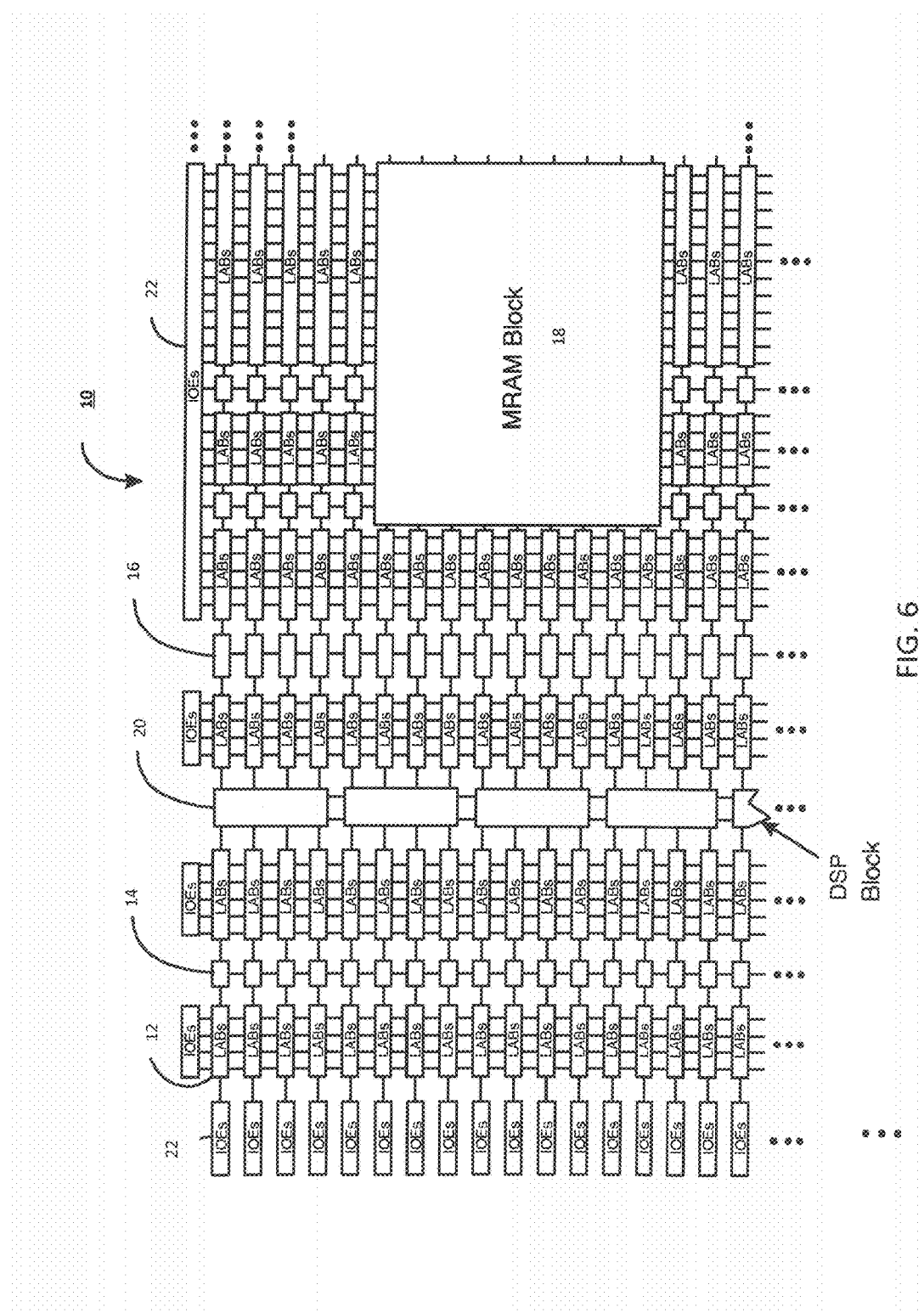
FIG. 6 is a simplified partial block diagram of an exemplary field programmable gate array (FPGA) that may be configured using techniques disclosed herein.

FIG. 6 is a simplified partial block diagram of an exemplary field programmable gate array (FPGA) 10 that may be configured using techniques disclosed herein. It should be understood that embodiments of the present invention can be used with numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (e.g., an I/O pin) of FPGA 10.

It is to be understood that FPGA 10 is described herein for illustrative purposes only and that the present invention can be implemented in many different types of PLDs, FPGAs, and ASICs.

Figure 7:
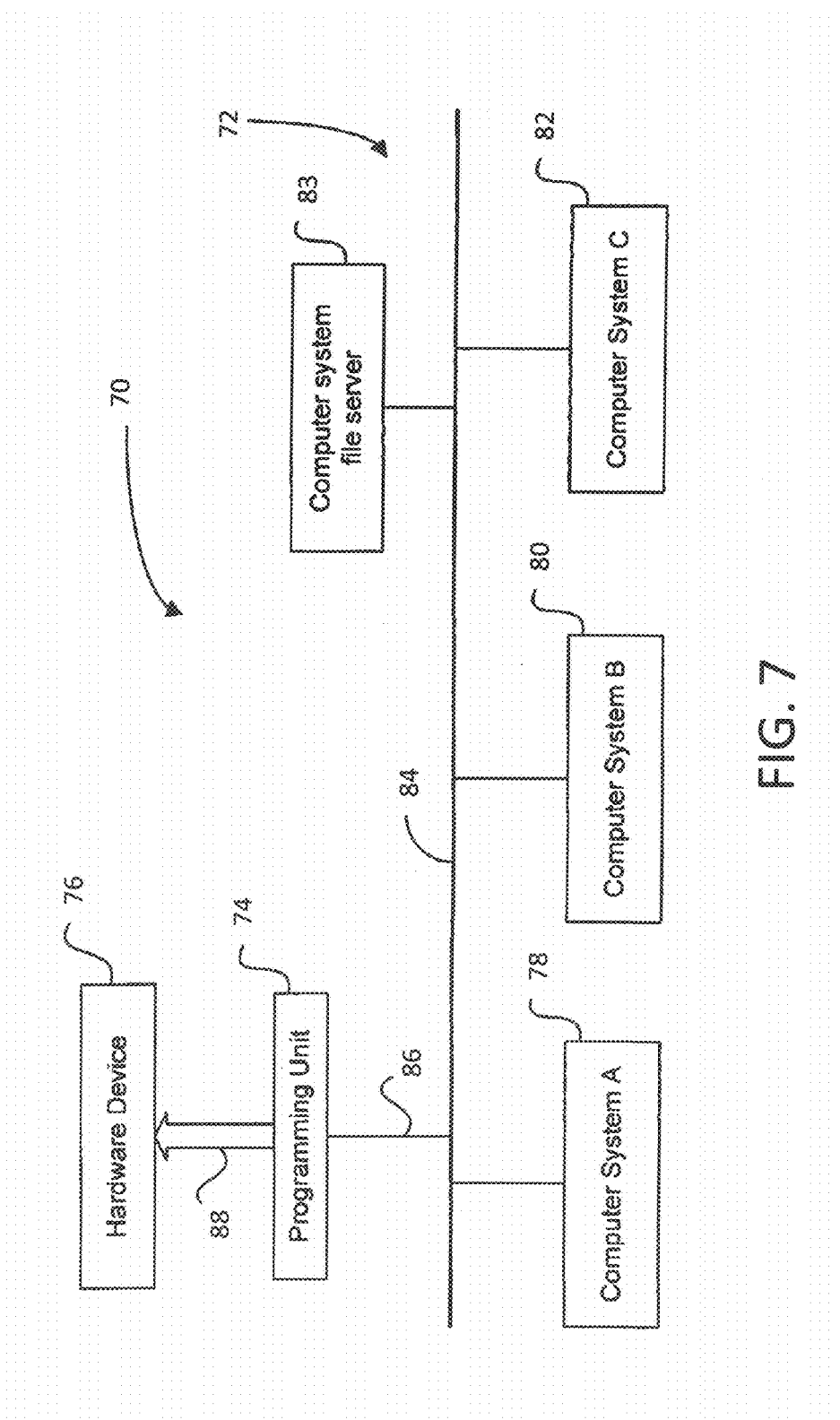
FIG. 7 is a block diagram of an embodiment of a programmable logic development system that can be used in connection with embodiments of the present invention.

FIG. 7 is a block diagram of an embodiment of a programmable logic development system 70 that includes a computer network 72, a programming unit 74 and a hardware device 76 (for example, a programmable logic device) that is to be programmed. Computer network 72 includes any number of computers connected in a network such as computer system A 78, computer system B 80, computer system C 82 and computer system file server 83 all connected together through a network connection 84. Computer network 72 is connected via a cable 86 to programming unit 74, which in turn is connected via a programming cable 88 to the hardware device 76. Alternatively, only one computer system could be directly connected to programming unit 74. Furthermore, computer network 72 need not be connected to programming unit 74 at all times, such as when a design is being developed, but might be connected only when device 76 is being programmed.

Programming unit 74 may be any suitable hardware programming unit that accepts program instructions from computer network 72 in order to program PLD 76. By way of example, programming unit 74 may include an add-on logic programmer card for a computer, and a master programming unit, such as are commercially available from Intel Programmable Solutions Group of San Jose, Calif. PLD 76 may be present in a system or in a programming station. In operation, a number of engineers, designers and/or users may use computer network 72 to develop programming instructions using an electronic-design automation tool 90 that may be executing on one of the computer systems. Once a design has been developed and entered, the design is compiled and verified before being downloaded to the programming unit, which then uses the downloaded design to program PLD 76.

In accordance with an embodiment of the invention, the electronic-design automation tool 90 may include a signal-to-pad assignment module 92 that implements the innovative method disclosed herein of assigning signals to general-purpose input/output pads of a programmable integrated circuit chip.

Conclusion

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of assigning signals to general-purpose input/output pads of an integrated circuit chip, the method comprising:
    obtaining, using a computer, an inductance matrix for the input/output pads;
    making a candidate assignment of a differential signal to a pair of the input/output pads;
    determining a differential mutual inductance for each open pad location in relation to the pair of input/output pads;
    assigning a single-ended signal to an open pad location having a lowest differential mutual inductance;
    computing a jitter contribution due to the single-ended signal; and
    updating a total jitter with the jitter contribution.

2. The method of claim 1, further comprising:
    repeating said assigning, computing and updating steps until the total jitter exceeds a total jitter budget.

3. The method of claim 2, further comprising:
    when the total jitter exceeds the total jitter budget, undoing a preceding assignment and reducing the total jitter by the jitter contribution of the preceding assignment; and
    storing a resultant set of signal-to-pad assignments for the single-ended signals, along with the total jitter, in relation to the candidate assignment of the differential signal.

4. The method of claim 3, further comprising:
    when there is a further candidate assignment to process, looping back and making the further candidate assignment, then repeating said determining, assigning, computing, updating and repeating steps.

5. The method of claim 4, further comprising:
    selecting and outputting an optimal assignment that is the candidate assignment with a highest number of single-ended signals being assigned within the total jitter budget.

6. The method of claim 1, further comprising:
    repeating said assigning, computing and updating steps until a number of assigned single-ended signals is equal to a target number.

7. The method of claim 6, further comprising:
    when the number of assigned single-ended signals is equal to the target number, storing a resultant set of signal-to-pad assignments for the single-ended signals, along with the total jitter, in relation to the candidate assignment of the differential signal.

8. The method of claim 7, further comprising:
    when there is a further candidate assignment to process, looping back and making the further candidate assignment, then repeating said determining, assigning, computing, updating and repeating steps.

9. The method of claim 8, further comprising:
    selecting and outputting an optimal assignment that is the candidate assignment with a highest number of single-ended signals being assigned within the total jitter budget.

10. The method of claim 1, wherein the candidate assignment involves assigning a plurality of differential signals to a plurality of pairs of the input/output pads.

11. The method of claim 1, further comprising:
    pre-assigning power-related inputs to the input/output pads.

12. The method of claim 1, further comprising:
    sorting the open pad locations by their differential mutual inductance.

13. A non-transitory computer-readable medium comprising instructions stored thereon, that when executed on a processor, perform the steps of:
    obtaining, using a computer, an inductance matrix for the input/output pads of an integrated circuit chip;
    making a candidate assignment of a differential signal to a pair of the input/output pads;
    determining a differential mutual inductance for each open pad location in relation to the pair of input/output pads;
    assigning a single-ended signal to an open pad location having a lowest differential mutual inductance;
    computing a jitter contribution due to the single-ended signal; and
    updating a total jitter with the jitter contribution.

14. The non-transitory computer-readable medium of claim 13, wherein the steps further comprise:
    repeating said assigning, computing and updating steps until the total jitter exceeds a total jitter budget.

15. The non-transitory computer-readable medium of claim 14, wherein the steps further comprise:
    when the total jitter exceeds the total jitter budget, undoing a preceding assignment and reducing the total jitter by the jitter contribution of the preceding assignment; and
    storing a resultant set of signal-to-pad assignments for the single-ended signals, along with the total jitter, in relation to the candidate assignment of the differential signal.

16. The non-transitory computer-readable medium of claim 15, wherein the steps further comprise:
    when there is a further candidate assignment to process, looping back and making the further candidate assignment, then repeating said determining, assigning, computing, updating and repeating steps.

17. The non-transitory computer-readable medium of claim 16, wherein the steps further comprise:
    selecting and outputting an optimal assignment that is the candidate assignment with a highest number of single-ended signals being assigned within the total jitter budget.

18. The non-transitory computer-readable medium of claim 13, wherein the steps further comprise:
    repeating said assigning, computing and updating steps until a number of assigned single-ended signals is equal to a target number.

19. The non-transitory computer-readable medium of claim 18, wherein the steps further comprise:

when the number of assigned single-ended signals is equal to the target number, storing a resultant set of signal-to-pad assignments for the single-ended signals, along with the total jitter, in relation to the candidate assignment of the differential signal.

20. The non-transitory computer-readable medium of claim 19, wherein the steps further comprise:

when there is a further candidate assignment to process, looping back and making the further candidate assignment, then repeating said determining, assigning, computing, updating and repeating steps; and selecting and outputting an optimal assignment that is the candidate assignment with a highest number of single-ended signals being assigned within the total jitter budget.

21. A system for assigning signals to general-purpose input/output pads of an integrated circuit chip, the system comprising:

an electronic-design automation tool executing on a computer; and a signal-to-pad assignment module of the electronic-design automation tool, wherein the module is programmed to perform the steps of obtaining, using the computer, an inductance matrix for the input/output pads, making a candidate assignment of a differential signal to a pair of the input/output pads, determining a differential mutual inductance for each open pad location in relation to the pair of input/output pads, assigning a single-ended signal to an open pad location having a lowest differential mutual inductance, computing a jitter contribution due to the single-ended signal, and updating a total jitter with the jitter contribution.

* * * * *